(12) United States Patent
Xu

(10) Patent No.: US 7,842,114 B2
(45) Date of Patent: Nov. 30, 2010

(54) VESSEL FOR RECEIVING A FLUID INCLUDING A DEMISTER

(75) Inventor: Zhanping Xu, East Amherst, NY (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/176,309

(22) Filed: Jul. 18, 2008

(65) Prior Publication Data

US 2010/0011724 A1  Jan. 21, 2010

(51) Int. Cl.
*B01D 45/00* (2006.01)

(52) U.S. Cl. ............... 55/440; 55/442; 55/444; 55/450; 55/464; 55/465; 55/DIG. 14; 96/356; 96/358; 96/360; 96/188; 96/190

(58) Field of Classification Search .......... 55/440, 55/442–445, 464–465, DIG. 14; 96/356, 96/358, 360, 188–190
See application file for complete search history.

(56) References Cited

U.S. PATENT DOCUMENTS

| 2,631,022 | A | * | 3/1953 | Baird et al. .............. 261/30 |
| 2,643,737 | A | * | 6/1953 | Bowers et al. ........... 55/349 |
| 2,848,061 | A | * | 8/1958 | Allander et al. ......... 55/349 |
| 2,854,092 | A | * | 9/1958 | Gustavsson ............. 55/349 |
| 2,921,777 | A | * | 1/1960 | Hepp ..................... 261/114.2 |
| 2,934,166 | A |   | 4/1960 | Rossum |
| 3,065,587 | A | * | 11/1962 | Fordyce et al. .......... 55/442 |
| 3,373,089 | A |   | 3/1968 | Vautrain et al. |
| 3,826,064 | A |   | 7/1974 | Nye et al. |
| 3,853,513 | A |   | 12/1974 | Carson |
| 3,853,514 | A | * | 12/1974 | Post .......................... 96/230 |
| 3,923,480 | A | * | 12/1975 | Visch ....................... 96/360 |
| 3,997,303 | A |   | 12/1976 | Newton |
| 4,099,938 | A | * | 7/1978 | Onnen ...................... 96/229 |
| 4,140,501 | A | * | 2/1979 | Ekman ..................... 96/232 |
| 4,767,424 | A |   | 8/1988 | McEwan |
| 4,787,920 | A | * | 11/1988 | Richard ................... 95/214 |
| 4,936,881 | A | * | 6/1990 | Jorzyk et al. ............ 96/232 |
| 5,112,375 | A |   | 5/1992 | Brown |
| 5,264,137 | A |   | 11/1993 | McCullough, Jr. et al. |
| 6,059,934 | A |   | 5/2000 | Stober et al. |
| 6,083,302 | A | * | 7/2000 | Bauver et al. ........... 95/216 |
| 6,312,504 | B1 | * | 11/2001 | Both et al. .............. 95/214 |
| 6,376,732 | B1 |   | 4/2002 | Ngan et al. |
| 6,818,036 | B1 | * | 11/2004 | Seaman ................... 55/426 |
| 7,025,808 | B2 |   | 4/2006 | Huber et al. |
| 7,288,129 | B2 | * | 10/2007 | Oh et al. ................. 55/426 |
| 7,303,735 | B2 |   | 12/2007 | Suchak et al. |
| 2001/0015136 | A1 | * | 8/2001 | Letzel ...................... 96/356 |

(Continued)

FOREIGN PATENT DOCUMENTS

JP  55044362 A  *  3/1980

(Continued)

*Primary Examiner*—Jason M Greene
*Assistant Examiner*—Dung Bui
(74) *Attorney, Agent, or Firm*—Mark Goldberg

(57) ABSTRACT

One exemplary embodiment can be a vessel for receiving a fluid. The vessel may include a shell and a demister including at least one section positioned proximate to the shell. Each section can have a first surface for primarily receiving the fluid and orientated, independently, about 5—about 85° with respect to horizontal.

9 Claims, 5 Drawing Sheets

U.S. PATENT DOCUMENTS

| | | |
|---|---|---|
| 2005/0204917 A1 | 9/2005 | Haland et al. |
| 2007/0137154 A1 | 6/2007 | Agnello et al. |
| 2009/0031524 A1* | 2/2009 | Courtney et al. ............... 15/347 |
| 2009/0113861 A1* | 5/2009 | Seo et al. ...................... 55/429 |

FOREIGN PATENT DOCUMENTS

| | | | |
|---|---|---|---|
| JP | 57081617 A | * | 5/1982 |
| JP | 58018098 A | * | 2/1983 |
| JP | 2005347024 | | 12/2005 |
| WO | WO-2006/132527 A1 | | 12/2006 |

\* cited by examiner

VESSEL FOR RECEIVING A FLUID INCLUDING A DEMISTER

FIELD OF THE INVENTION

This invention generally relates to a vessel receiving a fluid and including a demister.

DESCRIPTION OF THE RELATED ART

Many industrial processes use gas-liquid separation devices to remove liquid droplets from a gas stream. Particularly, these devices are used with fluid streams that typically include multiple phases and can include suspensions such as a vapor, a mist, or an aerosol. The process vessels used for such streams can include flash drums, vapor-liquid separators, receivers, storage tanks, scrubbers, absorbers, and distillation columns.

Generally, it is desirable to minimize the height of such process vessels to save space and/or materials. Unfortunately, often demisters are set a great deal above the fluid inlet to allow the incoming fluid to expand and disperse, and obtain uniformity before the fluid enters into the demister. As a result, this compensation may increase the size and/or height of the vessel. As such, it would be desirable to place a demister closer to a fluid inlet to reduce at least the height of the vessel. Also, such demisters are typically installed horizontally in the vessel and are limited by its cross-sectional area. It would be desirable to not be limited by the cross-sectional area of the vessel. As a consequence, it would be beneficial to provide a demister that would not be limited as such.

SUMMARY OF THE INVENTION

One exemplary embodiment can be a vessel for receiving a fluid. The vessel may include a shell and a demister including at least one section positioned proximate to the shell. Each section can have a first surface for primarily receiving the fluid and orientated, independently, about 5—about 85° with respect to horizontal.

Another exemplary embodiment can be a vessel for receiving a fluid. The vessel can include a shell and a demister. Generally, the demister includes at least one section having a height and a width. Typically, the height of the section exceeds its width and is orientated substantially vertical.

A further exemplary embodiment may be a vessel for receiving a fluid. The vessel can include a shell including an internal diameter, a fluid inlet, and a demister. Generally, the fluid inlet includes a top at a first elevation and is adapted to provide the fluid at a tangential relation with respect to a circumference of the shell. Additionally, the demister can include a bottom at a second elevation. The second elevation can be above the first elevation and separated from the first elevation by a distance of not more than about one-half of the internal diameter of the shell.

The embodiments disclosed herein can provide a demister having a greater demisting surface area than the cross-sectional area of the vessel. As such, the demister can be positioned proximate to the fluid inlet, allowing a reduction in the height of the vessel.

DEFINITIONS

As used herein, the term "fluid" generally includes one or more gases and/or one or more liquids. The fluid may contain two or more phases, typically a liquid phase and a gas suspension, such as a vapor or an aerosol.

As used herein, the term "gas" can mean a single gas or a solution of a plurality of gases. In addition, the term "gas" may include a solution or a suspension of one or more liquid particles and/or one or more solid particles, e.g., a vapor or an aerosol, of the same or different substances, in one or more gases. A gas suspension, e.g., vapor, may contain two or more phases, such as a gas phase and a liquid phase of entrained liquid particles.

As used herein, the term "liquid" can mean a single liquid, or a solution or a suspension of a liquid and one or more gases, liquids, and/or solids.

As used herein, the term "rich" can mean an amount generally of at least about 50%, and preferably about 70%, by mole, of a compound or class of compounds in a stream.

As used herein, the term "substantially" can mean an amount generally of at least about 90%, preferably about 95%, and optimally about 99%, by mole, of a compound or class of compounds in a stream.

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g. a screw, a nail, a staple, or a rivet; an adhesive; or a solder.

DETAILED DESCRIPTION

Figure 1:
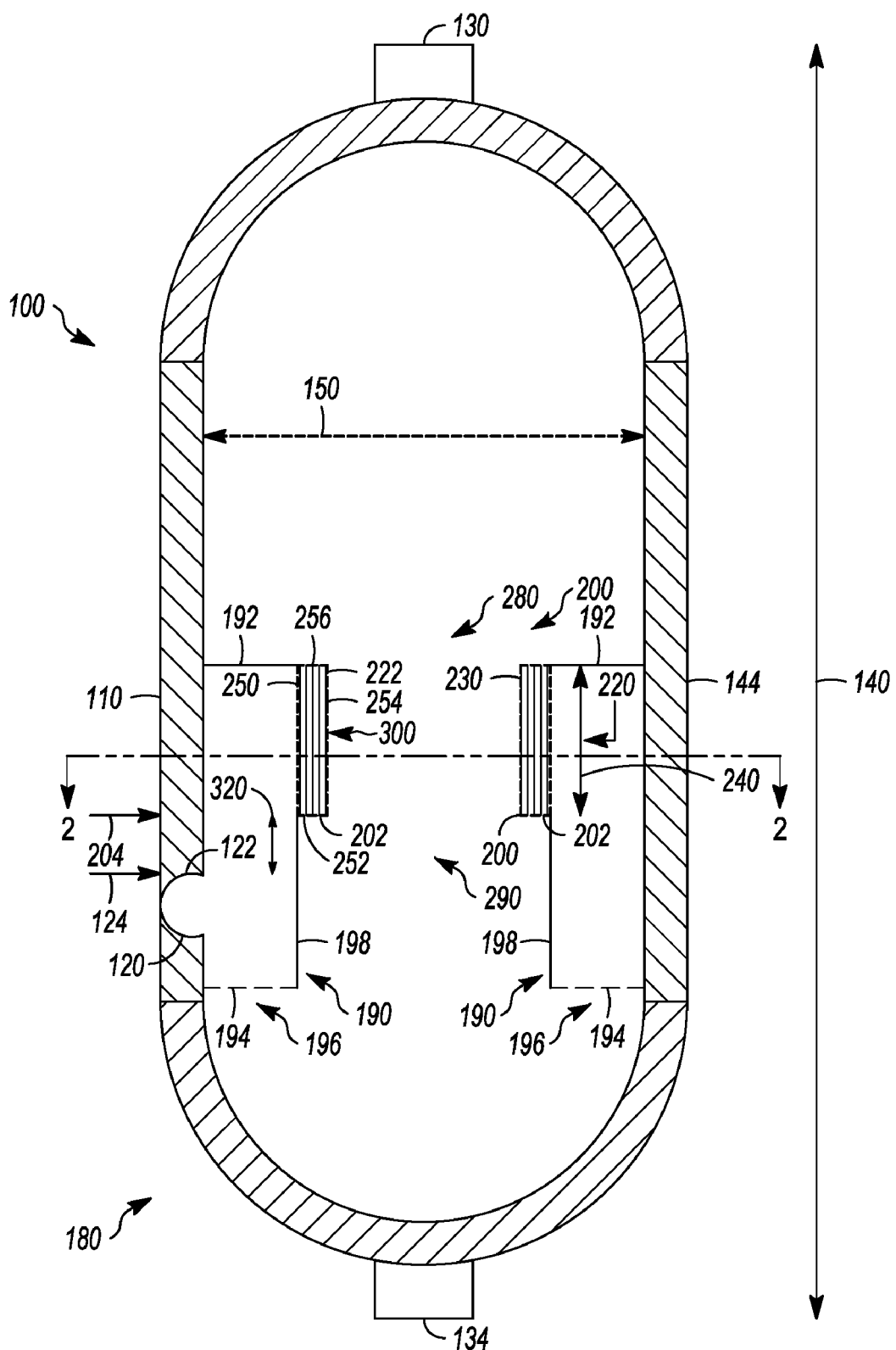
FIG. 1 is an elevational, cross-sectional view of an exemplary vessel.
Figure 2:
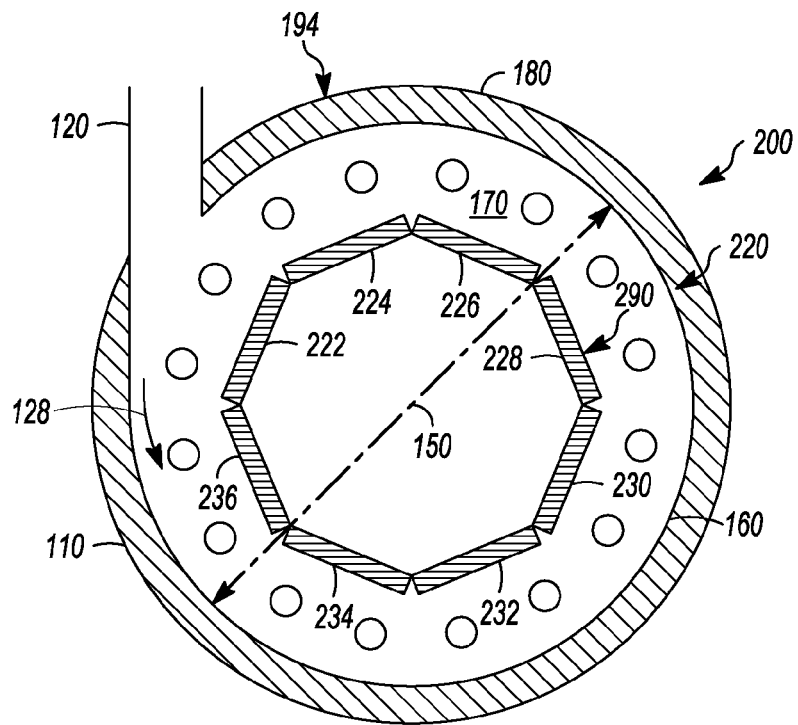
FIG. 2 is a plan, cross-sectional view of the exemplary vessel along line 2-2 of FIG. 1.
Figure 3:
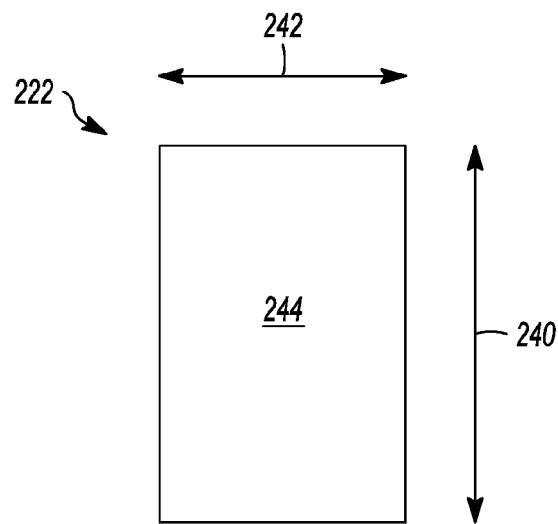
FIG. 3 is a front, elevational, and schematic view of an exemplary section of an exemplary demister.

Referring to FIGS. 1-3, an exemplary vessel 100 is depicted. The exemplary vessel 100 can receive a fluid through a fluid inlet 120. The fluid can include one or more phases, typically at least two phases. One phase can be rich in one or more liquids and the other phase can be rich in one or more gases. The vessel 100 can also include a first outlet 130 for a stream including a gas and a second outlet 134 for a stream including a liquid. Generally, the vessel 100 can have a height 140 and approximately a mid-height 144. Moreover, the vessel 100 can have a shell 110 forming an internal diameter 150 having a circumference 160. Generally, the vessel 100 has a cylindrical shape 180 and a cross-sectional area 170. The vessel 100 can be any suitable device, such as a flash drum, a vapor-liquid separator, a receiver, a storage tank, a scrubber, an absorber, or a distillation column.

The vessel 100 can also include a baffle 190, having a top 192, a bottom 194, and a side 198, and a demister 200 surrounding the fluid inlet 120 about the circumference of the vessel 100. Generally, the demister 200 is coupled to the baffle 190 at the top 192 and the side 198. The bottom 194 of the baffle 190 can form a plurality of holes 196 for discharging a liquid, and the top 192 and the side 198 of the baffle 190 can generally be impervious to fluid flow. The fluid can enter the fluid inlet 120 and separate into a first, liquid phase passing downward through the holes 194 toward an underneath device for channeling the liquid or the second outlet 134. Generally, a second, gas phase rises upwards and passes through the demister 200. Preferably, the fluid includes a first phase rich in one or more liquids and a second phase rich in one or more gases.

Generally, the gas phase can, in turn, contain two or more phases. One phase can be one or more gases, and the other phase can be one or more liquid and/or one or more solid particles in solution or suspension. As an example, the fluid can include a solution or a suspension, such as a vapor or an aerosol, of one or more solids and/or one or more liquids in one or more gases. In such a solution or a suspension, any size particle can be entrained in the gas. As described hereinafter, the fluid entering a demister will be described as a "vapor" having two phases, but it should be understood that any gas fluid can enter a demister.

Typically, the demister 200 is a vane demister including one or more vanes 300, although any suitable demister can be used. Exemplary vane demisters are disclosed in US 2007/0137154 A1 and U.S. Pat. No. 5,112,375. The demister 200 may be secured to a support structure in the vessel 100 using any suitable means, such as mechanical fasteners, including one or more bolts, hinges or pressure fittings, welds, glue, ties, or crimping. Alternatively, the demister 200 can be supported by the baffle 190 at the top 192 and side 198, which in turn may be incorporated into the walls of the vessel 100.

The demister 200 can include at least one section or a plurality of sections 220 and can include a first section 222, a second section 224, a third section 226, a fourth section 228, a fifth section 230, and a sixth section 232, a seventh section 234, and an eighth section 236. In addition, the sections 222, 224, 226, 228, 230, 232, 234, and 236 can be substantially similar. Consequently, only the section 222 will be described in detail hereinafter. However, it should be understood that sections 220 can be, independently, different. In this exemplary embodiment, each section 220 can be orientated substantially vertically 280 and can be substantially prism-shaped 290.

Referring to the first section 222, the first section 222 can have a height 240, a width 242, a demisting sectional area 244, a first surface 250, a second surface 252, a third surface 254, and a fourth surface 256. Generally, the height 240 and the width 242 form the first demisting sectional area 244, which is typically the first surface 250. Usually, the height 240 exceeds the width 242. Typically, vapor can penetrate the first surface 250 to allow the separation of liquid and/or solid particles therein. The second surface 252 can serve as an outlet, typically for liquid. The third surface 254 can serve as an outlet for the gas which can rise upwards through the vessel 100.

In addition, the vessel 100 can include an additional demister, such as a horizontally positioned substantially disc-shaped mesh demister. The mesh demister can be positioned above the demister 200 and below the first outlet 130. An exemplary mesh demister is disclosed in US 2005/0204917 A1.

A tangential fluid entry 128 and the enclosed space between the demister 200 and the shell 110 can facilitate placing the demister 200 close to the fluid inlet 120 to reduce the overall height of the vessel 100. Particularly, the fluid inlet 120 can have a top 122 at a first elevation 124, and the demister 200 can have a bottom 202 at a second elevation 204. This distance 320 between the first elevation 124 and the second elevation 204 can be minimized to reduce the height 140 of the vessel 100. Desirably, the distance 320 is not more than about one-half, about one-third, about one-quarter, or about one-tenth of the internal diameter of the shell 110. In one particularly preferred embodiment, the second elevation 204 can be essentially the same as or higher than the first elevation 124.

In operation, the fluid from the fluid inlet 120 can enter in the tangential relation 128 with respect to the circumference 160 of the vessel 100. This entry can facilitate the separation of one or more liquids and solids from one or more gases, and improve the fluid distribution to the demister 200. Generally, most of a liquid phase of the fluid is separated from the gas within the space enclosed between the demister 200 and the shell 110, and the liquid can be drained via the holes 194. Another phase, typically a vapor, can pass through the demister 200, particles can be separated within the vanes, and the gas can pass through the third surface 254. The liquid may be collected and discharged at the bottom 202 of the demister 200. Alternatively, liquid can be collected in a device, such as a funnel, and discharged below the fluid inlet 120. The collected liquid can exit the vessel 100 through the outlet 134. Alternatively, the liquid can be discharged to a lower mass transfer device, such as a tray or packing. Afterwards, the gas can escape through the third surface 254 and flow upwards to another demister or exit the first outlet 130. Alternatively, the gas can flow to an upper mass transfer device such as a tray or packing. The substantially vertical arrangement of the sections 220 of the demister 200 can provide collectively a greater demisting sectional area than the cross-sectional area 170 of the vessel 100. Thus, typically the sum of the demisting sectional areas exceeds the cross-sectional area 170 of the vessel 100.

Figure 4:
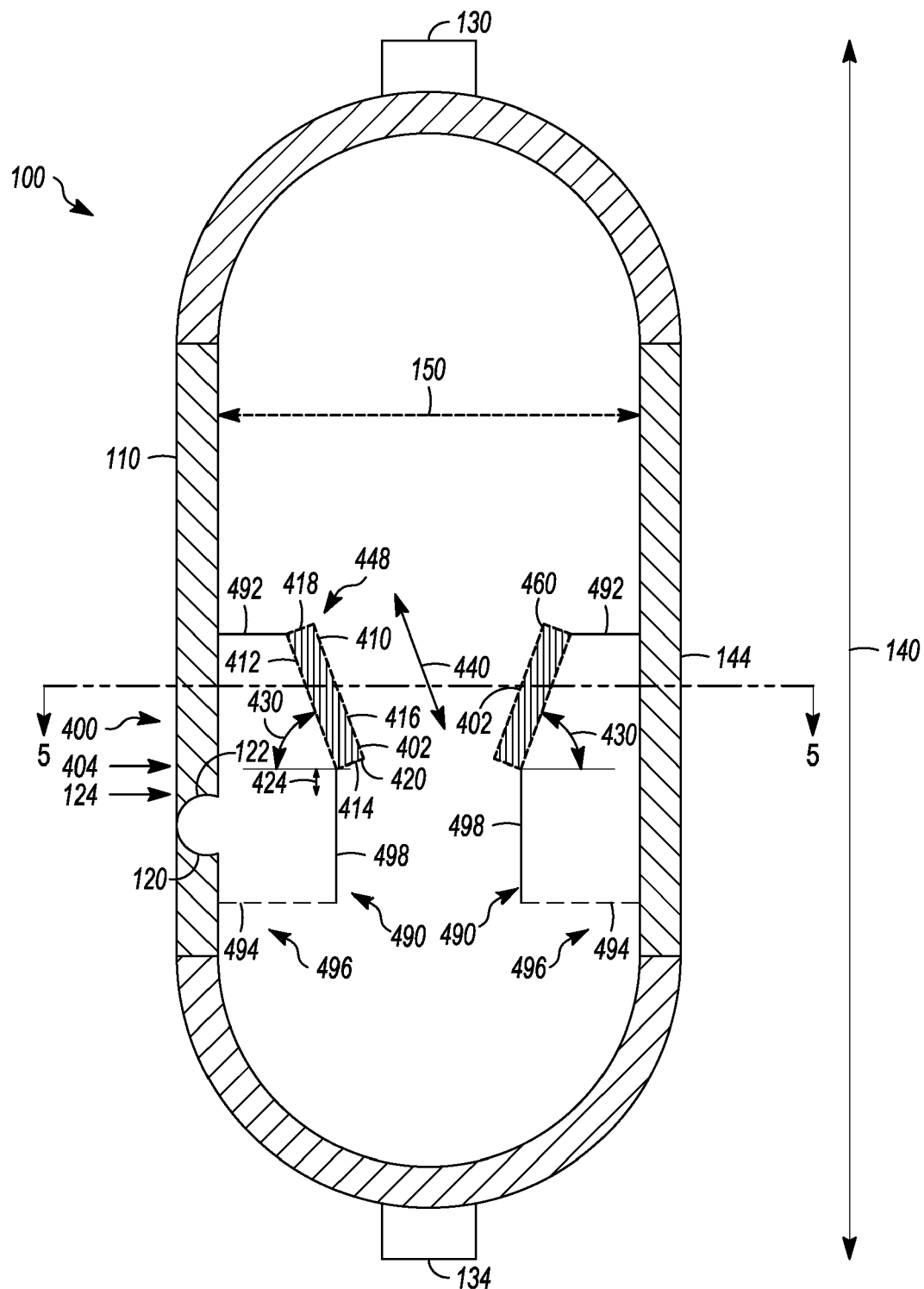
FIG. 4 is an elevational, cross-sectional view of another exemplary vessel.
Figure 5:
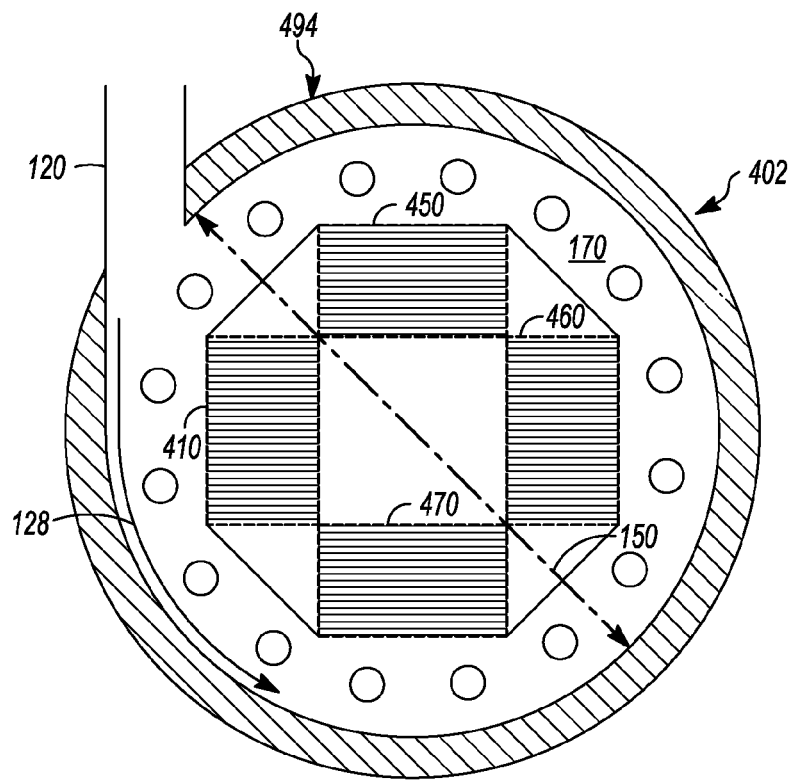
FIG. 5 is a plan, cross-sectional view along line 5-5 of the exemplary vessel of FIG. 4.
Figure 6:
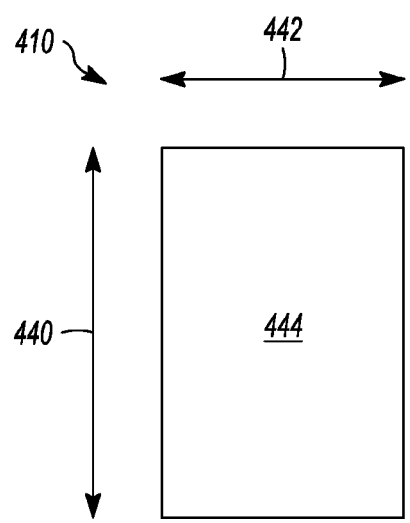
FIG. 6 is a front, elevational view of another exemplary section of another exemplary demister.

Referring to FIGS. 4-6, another demister 400 is depicted inside the vessel 100. Instead of a demister 200, a demister 400 can be provided. Preferably, the demister 400 is a vane demister. The demister 400 can include at least one section or a plurality of sections 402, particularly, a first section 410, a second section 450, a third section 460, and a fourth section 470. Although four sections are depicted, it should be understood that any number of the sections 402 can be utilized. In addition, in this preferred embodiment, the sections 410, 450, 460, and 470 can be substantially identical. As a consequence, only section 410 will be described in detail hereinafter. However, it should be understood sections 402 can be, independently, different.

The first section 410 can include a first surface 412, a second surface 414, a third surface 416, and a fourth surface 418. Moreover, the section 410 can have a height 440 and a width 442 forming a demisting sectional area 444. The collective demisting sectional areas of each demister sections 402 can be greater than the cross-sectional area 170 of the vessel 100. Typically, the each demister section 410 can be orientated at an angle of about 5—about 85°, preferably about 30—about 60°, with respect to horizontal. It should be understood that the ranges can include a corresponding supplementary angle, e.g., an angle of 120° is supplemental to an angle of 60°. Thus, the supplementary angle of 120° can be included in the range of about 30—about 60°.

The fluid can enter the first surface 412 and penetrate the demister 400. The gas can escape through the surface 416 while the liquid can flow downward toward the surface 414. The liquid can be collected approximate to the surface 414 and be discharged below the fluid inlet 120 or to the bottom of the vessel 100. Alternatively, the liquid can be discharged to a lower mass transfer device, such as a tray or packing. The gases can rise through the vessel 100 to another optional demister and/or exit through the outlet 130. Alternatively, the gas can flow to an upper mass transfer device such as a tray or packing. Although the sections 402 are depicted as substantially prism-shaped 448, it should be understood that any shape can be utilized. In addition, the angle 430 orientating the demister 400 can allow the collective sectional area of the demister sections 402 to exceed that of the vessel 100. In addition, the top 122 of the inlet 120 at the first elevation 124 can be at a distance 424 from a bottom 420 of the demister 400 at the second elevation 404. This distance 424 can be minimized to reduce the height 140 of the vessel 100. As such, the distance 424 can have the same relation to the internal diameter of the shell 110 as the distance 320, as discussed above. In addition, the demister 400 can be fastened within the vessel 100 using any suitable means, as discussed above.

What is more, the vessel 100 can include a baffle 490 having a top 492, a bottom 494, and a side 498, and the bottom 494 can form a plurality of holes 496. Generally, the baffle 490 can have a similar structure and function as the baffle 190 as discussed above. Also, the demister 400 can operate similarly as the demister 200, and the vessel 100 can include an additional demister, such as a horizontally positioned substantially disc-shaped mesh demister, as discussed above.

Figure 7:
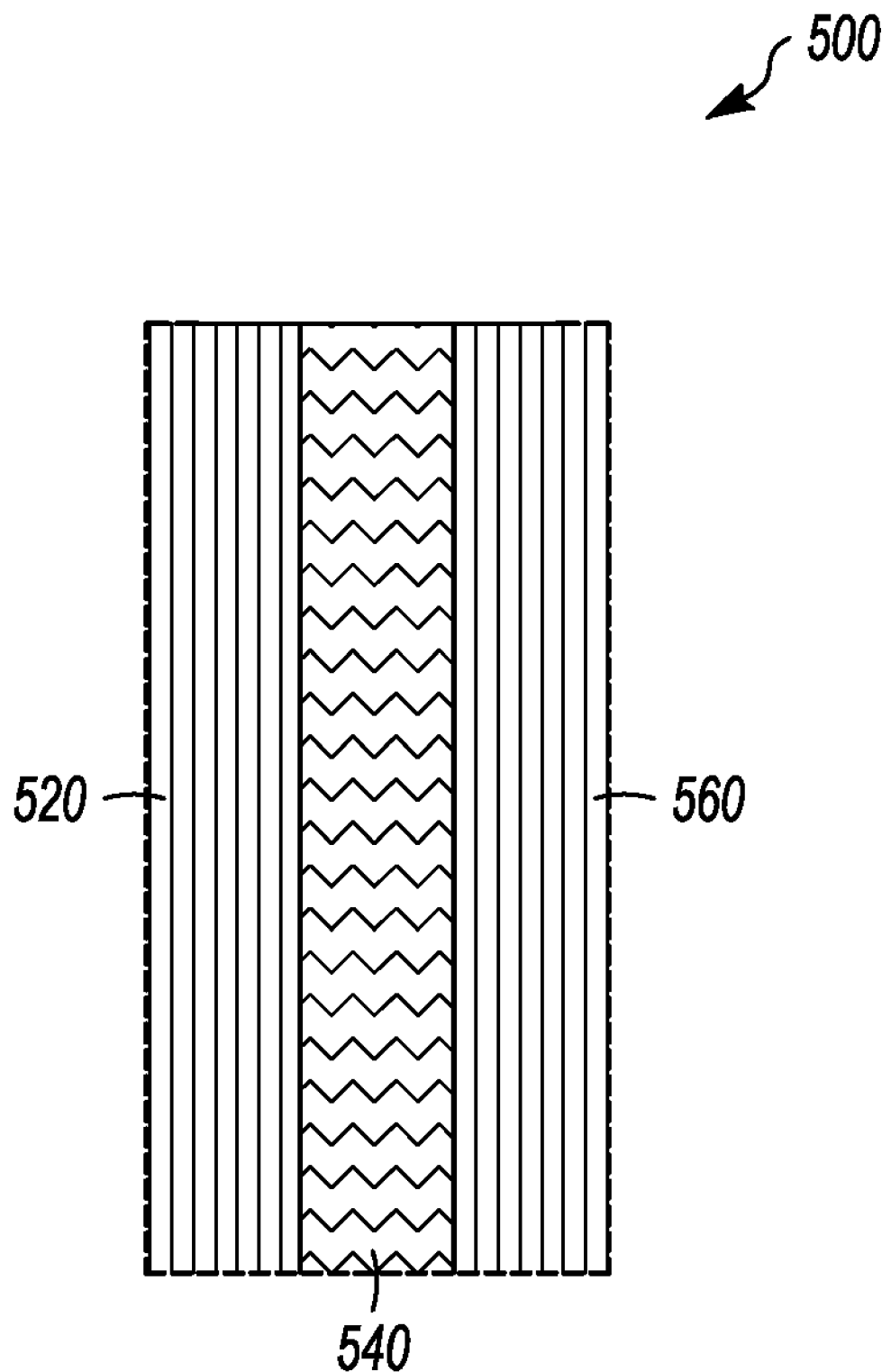
FIG. 7 is a side, elevational view of yet another exemplary demister including three exemplary regions.

Referring to FIG. 7, yet another exemplary demister 500 is depicted. The demister 500 can include a first region 520, a second region 540, and a third region 560. Generally, the first region 520 and the third region 560 sandwich the second region 540. Although three regions are depicted, it should be understood that the demister 500 can include any number of regions in any order, including only the first region 520 and second region 540. Thus, the demister 500 can include first and second regions 520 and 540, or first and third regions 520 and 560 sandwiching the second region 540. Typically, the demister 500 can be used instead of the demister 200 or the demister 400 in the vessel 100. The different regions, independently, may have different types of demisters, such as at least one vane or at least one mesh demister, or the same type of demister with different properties for providing high separation efficiency, low pressure drop, and less susceptibility to fouling or plugging.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A vessel for receiving a fluid, comprising:
   A) a shell; and
   B) a demister comprising at least one section positioned proximate to the shell wherein each section comprising vanes has a first surface for primarily receiving the fluid and orientated, independently, about 5—about 85° with respect to horizontal and wherein the demister comprises a plurality of sections wherein each demister section is orientated, independently, about 30—about 60° with respect to horizontal.

2. The vessel according to claim 1, wherein the fluid comprises a vapor.

3. The vessel according to claim 1, wherein the vessel comprises a flash drum, a vapor-liquid separator, a receiver, a storage tank, a scrubber, an absorber, or a distillation column.

4. The vessel according to claim 1, wherein each section of the demister is substantially prism-shaped.

5. The vessel according to claim 1, wherein the fluid comprises a first phase rich in one or more liquids and a second phase rich in one or more gases, wherein the second phase passes through the demister.

6. The vessel according to claim 1, wherein each section of the demister further comprises first and second regions wherein the first region comprises one or more vanes and the second region comprises at least one mesh.

7. The vessel according to claim 1, wherein each section of the demister further comprises first, second, and third regions wherein the first and third regions comprise one or more vanes that sandwich the second region comprising at least one mesh.

8. A vessel for receiving a fluid, comprising:
   A) a shell; and
   B) a mesh demister comprising at least one section positioned proximate to the shell wherein each section has a first surface for primarily receiving the fluid and orientated, independently, about 5—about 85° with respect to horizontal and wherein the demister comprises a plurality of sections wherein each demister section is orientated, independently, about 30—about 60° with respect to horizontal.

9. The vessel according to claim 8, wherein each section of the demister is substantially prism-shaped.

* * * * *